T. M. DANIELS.
SELF LOCKING NUT.
APPLICATION FILED SEPT. 17, 1913.
1,130,481.
Patented Mar. 2, 1915.
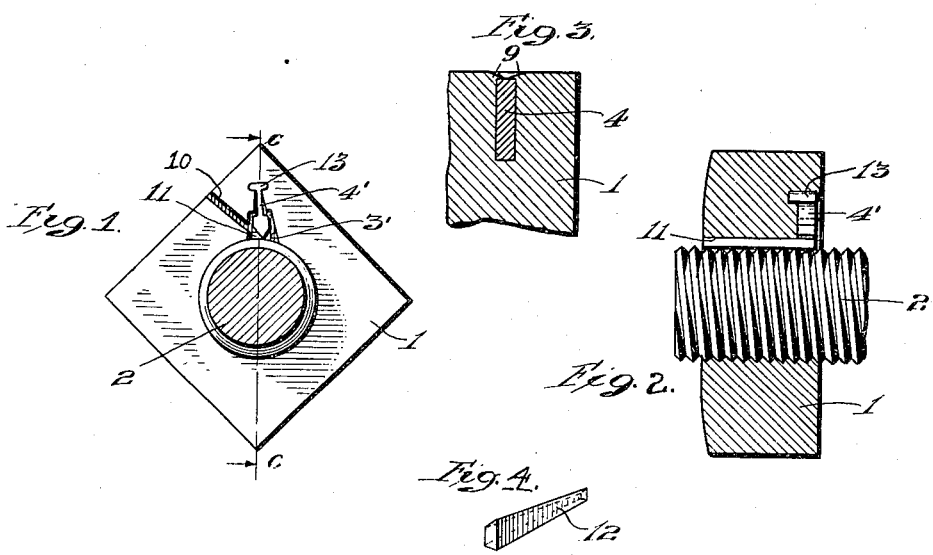

UNITED STATES PATENT OFFICE.

THOMAS MARION DANIELS, OF CHICAGO, ILLINOIS.

SELF-LOCKING NUT.

1,130,481.  Specification of Letters Patent.  Patented Mar. 2, 1915.

Application filed September 17, 1913. Serial No. 790,148.

*To all whom it may concern:*

Be it known that I, THOMAS M. DANIELS, a citizen of the United States, and a resident of the city of Chicago, county of Cook, and State of Illinois, have invented certain new and useful Improvements in Self-Locking Nuts, of which the following is a specification.

My invention relates to improvements in self-locking nuts and has for its object the provision of an improved construction of this character which is efficient in operation, simple in construction, and capable of economical manufacture.

The invention consists in the combinations and arrangements of parts hereinafter described and claimed.

The invention will be best understood by reference to the accompanying drawing forming a part of this specification, and in which, Figure 1 is a bottom plan view of a construction embodying my invention showing the bolt in section, Fig. 2, a section taken on line $c$—$c$ of Fig. 1, Fig. 3, an enlarged section taken through the nut, illustrating means employed for securing a locking member in position, and Fig. 4, a perspective view of a tool or instrument which may be employed for removing the nut.

The preferred form of construction, as illustrated in the drawings comprises an ordinary square nut 1 which is threaded upon its bolt 2 in the usual manner. Nut 1 is provided with a recess 3' on its under side adjacent bolt 2, and a locking member 4' is arranged in recess 31' and provided with a sharpened edge adapted to impinge upon or contact with threads on bolt 2 to prevent loosening of nut 1 after it has been tightened. This action of locking member 4' is due to the fact that, when the nut is tightened by being rotated in one direction, said member rides freely on the threads of the bolt, but when attempt is made to rotate the nut in the opposite direction, the sharpened edge of said member "bites" into the thin edges of the threads thus effectually locking the nut against loosening. The recess 3' is provided at its outer portion with lateral extensions giving said recess a shape substantially T-shaped in cross section with the stem of the T pointing toward the bolt, and a depression is provided at the outer bottom portion of said recess. The locking member is provided at its outer end with a T-head 13 fitting within the outer portion of recess 3', said head being also provided with an inwardly extending extension fitting the depression in the recess. Locking member 4' is made of slightly less depth than recess 3' and is secured in position therein by up-setting the edges 9 over the outer portion of said locking member, as indicated in Figs. 2 and 3. This up-setting of the edges 9 may be readily effected after the member 4' is placed in position by a few blows with a hammer, as will be readily understood.

In order to facilitate the removal of the nut when desired, the under side thereof is provided with a channel or recess 10 leading into recess 3', and so positioned as to permit the insertion of a flat blade-like instrument into recess 3' and between the sharpened edge of locking member 4' and the threads of the bolt, thus preventing engagement of said sharpened edge with said threads and permitting removal of the nut. The nut is also provided with a channel 11 extending therethrough adjacent the threads of bolt 2 and adapted to permit the insertion of a wedge-like instrument 12 to force locking member 4' out of engagement with the threads to permit loosening of the nut, as will be readily understood. The channel 11 is provided for use in situations where channel 10 would be inaccessible and for the further reason that wedge member 12 will automatically lock member 4' in an inoperative position.

The construction disclosed constitutes a simple and efficient one for the purpose, and one which may be readily manufactured by the use of stamping dies, thus conducing toward economy in manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of a nut and a bolt, said nut being provided with a recess therein adjacent said bolt, the outer portion of said recess being provided with lateral extensions forming a T-shaped recess with the stem of the T pointing toward said bolt; and a locking member mounted in said recess and provided with an edge arranged to impinge upon the threads of said bolt, said locking member being T-shaped in cross section at its outer end to fit said recess, substantially as described.

2. The combination of a nut and a bolt, said nut being provided with a recess therein adjacent said bolt and extending but part way through said nut, the outer portion of said recess being provided with lateral extensions to form a recess T-shaped in cross section with the stem of the T pointing toward said bolt; and a locking member mounted in said recess, T-shaped in cross section to fit said recess and provided with an edge arranged to impinge upon the threads of said bolt, said member being of less depth than said recess and the edges of said recess being upset over the outer portion of said member to maintain the same in position, substantially as described.

In testimony whereof I have signed my name to this specification in the presence of two subscribing witnesses.

THOMAS MARION DANIELS.

Witnesses:
JOSHUA R. H. POTTS,
HELEN F. LILLIS.

Copies of this patent may be obtained for five cents each, by addressing the "Commissioner of Patents, Washington, D. C."